Figure 1:
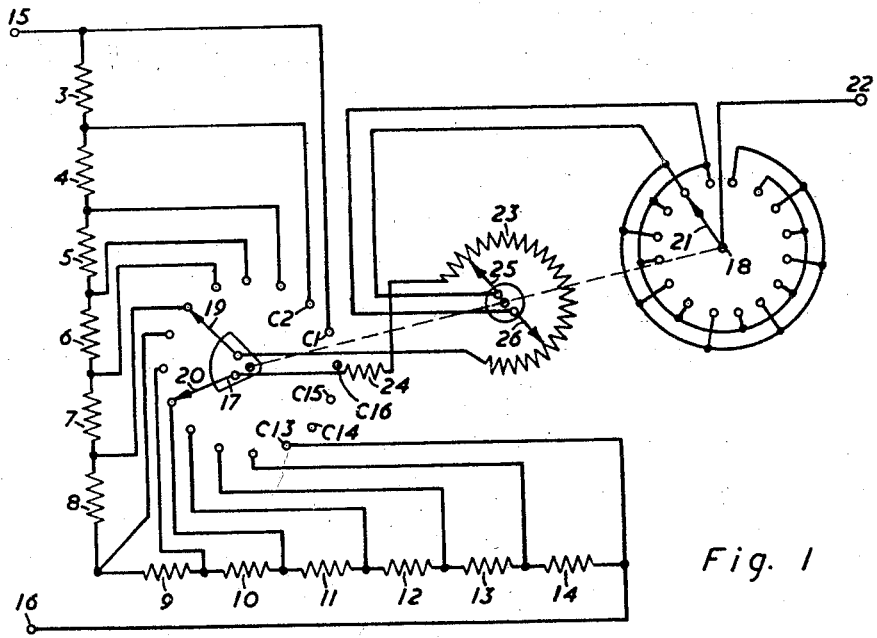

March 28, 1950  E. FRANKLIN  2,501,813
VARIABLE RESISTANCE DEVICE
Filed July 1, 1947

ERNEST FRANKLIN
Inventor
By
Attorneys

Patented Mar. 28, 1950

2,501,813

UNITED STATES PATENT OFFICE 2,501,813

VARIABLE RESISTANCE DEVICE

Ernest Franklin, Bilston, England, assignor to Minister of Supply, in His Majesty's Government of the United Kingdom of Great Britain and Northern Ireland, London, England Application July 1, 1947, Serial No. 758,355
In Great Britain July 3, 1946

14 Claims. (Cl. 201—48)

1

The present invention relates to variable impedance devices, and is concerned in particular with ensuring that the relationship between the motion of a control member and the impedance between a pair of terminals of the device obeys a pre-determined law with a high degree of accuracy.

Great accuracy is required, for example, in certain electromechanical computing devices, in which the voltage at a tapping on a potential divider is representative of the extent of motion of a control member; in such applications, a variable resistance device may be required to conform to a desired law, such as a linear law, with an accuracy of one part in 2000 or more. In practice, the overall accuracy with which the desired law is obeyed is often substantially less than that inherent in the variable resistance device itself, because of inaccuracies introduced by the means, for example, a gear train, through which the control member is driven.

The principal object of the present invention is to provide a variable resistance device in which great accuracy in conformity to a desired law is obtained with simplicity and reliability.

A further object of the invention is to offset the limitation in the accuracy of a variable resistance device, when driven through a mechanical linkage, due to manufacturing inaccuracies in the linkage.

According to the invention, therefore, a variable resistance device comprises a resistive element over which a plurality of wipers are adapted to move in continuous succession, the arrangement being such that the part of said element between adjacent wipers in contact with said element has a pre-determined resistance value, a plurality of fixed resistors, and first and second synchronously-operable switches, said first switch being arranged to vary connexions between said element and said fixed resistors in steps, and said second switch being arranged to transfer a connexion to a terminal of the device from one wiper to the next succeeding it at each step.

According to a feature of the invention, a variable resistance device suitable for use as a potential divider comprises a chain of fixed resistors connected in series between two input terminals, a resistive element over which a plurality of wipers are adapted to move in continuous succession arranged so that the part of said element between adjacent wipers in contact with said element has a pre-determined resistance value, a stepping switch adapted to connect said element across a part of said chain, the number of

2 resistors thus paralleled remaining constant as the points of connexion are shifted along the chain by steps each of one resistor, and a selector switch connected to an output terminal and adapted to transfer the output terminal from one wiper to the next succeeding it in synchronism with each shift of said stepping switch, the arrangement being such that when a potential difference is established between said input terminals, the potential difference between successive wipers in contact with said element is substantially equal to that across each of the fixed resistors outside said points of connexion.

In one embodiment of the invention, as set forth in the preceding paragraph, all the fixed resistors in the chain are of identical value, say R ohms, and each wiper is spaced from the one succeeding it by 2R ohms; further, assuming that the stepping switch spans $nR$ ohms, where $n$ is an integer, the total resistance of the variable element, together with any padding resistance it may be necessary to add, is also made equal to $nR$ ohms. It will be clear that, in this embodiment, the current in the variable element is one-half that in each of the fixed resistors not spanned by the stepping switch, but that since the resistance between the wipers is 2R, the change in potential difference at the output terminal due to the stepping switch making one step is exactly compensated by the change due to passing from one wiper to the next succeeding it. A smooth change in output voltage is thus obtained.

According to a further feature of the invention, a variable resistance device comprises first and second terminals, a plurality of fixed resistors, each of substantially the same pre-determined resistance value, a resistive element over which a plurality of wipers are adapted to move in continuous succession arranged so that the part of said element between adjacent wipers in contact with said element has said pre-determined resistance value, a stepping switch adapted to increase progressively in successive steps the number of said fixed resistors in series between said first terminal and said element, and a selector switch connected to said second terminal and adapted to transfer said second terminal from one wiper to the next succeeding it in synchronism with each step of said stepping switch.

The variable element of a device according to the invention is conveniently arcuate in form, and in the simplest construction of this nature, the wipers are two in number and spaced apart by 180°.

The switches are preferably multi-contact, rotary ones, and both switches and the wipers may be indirectly coupled, in any suitable way, for operation by common driving means: evidently, however, the couplings must be such as to permit the switches to dwell on their contacts until a change from one wiper to the next is due to take place.

The several fixed resistors may have values which differ slightly from one another. For example, where it is desired that a linear law shall obtain, but where departures from linearity are introduced by the influence of a circuit connected to the output terminal, the device may be compensated for such departures to a high order of accuracy by suitable choice of values for the several fixed resistors. More than two wipers may be employed, and in devices of the potential divider type, the arrangement may be made such that the current in the variable element is some other fraction of the current entering the chain than one half; thus if the current entering is I, the current in the variable element may be $I/m$, where $m$ is greater than two, in which case the resistance between successive wipers is made equal to $mR$.

Figure 2:
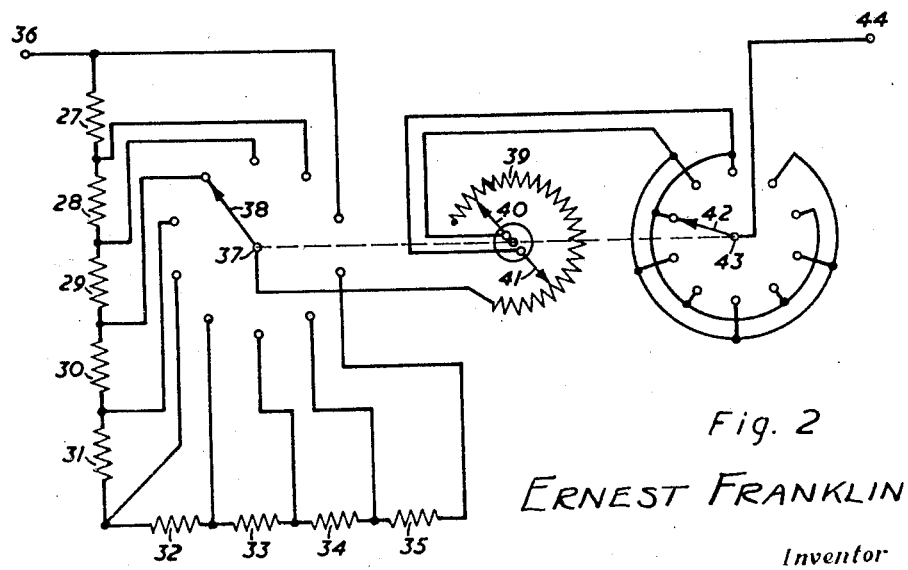

Two embodiments of the invention will now be described, by way of example, with reference to the accompanying drawing, in which Figs. 1 and 2 are schematic diagrams of, respectively, a potential divider and a two-terminal resistance of continuously adjustable value, both designed to obey a rectilinear law.

Referring to Fig. 1, twelve fixed resistors 3—14, each of a value which will be referred to as R, are connected in series between two input terminals 15, 16. Two rotary switches 17 and 18, each having sixteen contacts, are mechanically linked so that their moving contacts move round together in a manner further discussed below; switch 17, which has two moving contacts 19, 20 so spaced that they span four fixed contacts, as shown, serves as the stepping switch; the other switch, 18, has a single moving contact 21 connected to an output terminal 22, and constitutes the selector switch.

The input terminal 15 is connected to one fixed contact on switch 17, say $C_1$, the junction of fixed resistors 3 and 4 is connected to $C_2$, and so on; thus terminal 16 is connected to $C_{13}$, and $C_{14}$, $C_{15}$, and $C_{16}$ are unconnected. At any setting of switch 17, the two moving contacts span three of the fixed resistors. Moving contact 19 is connected to one end of an arcuate variable resistance element 23, the other end of which is connected through a fixed resistance 24 to the moving contact 20.

The variable element extends over an arc of some 250°, and is wound to have a uniform resistance along its length; it has two wipers 25, 26 which track continuously over the element so that they are always 180° apart, and the element is wound so that the resistance along the track between the wipers is equal to 2R. The total resistance of the variable element and the padding resistance 24 is made equal to 3R. Of the two wipers, one (say 25) is connected to all the even-numbered fixed contacts of switch 18, and the other, 26, is connected to all the odd-numbered contacts.

A rotating control member (which has been omitted from the drawing for simplicity) governs the continuous rotary movement of the wipers 25, 26 over the variable element, and intermittently operates the two switches. It is arranged that when, for example, the stepping switch 17 shifts on one step in the direction 15 to 16, the selector switch 18 operates simultaneously to transfer the output terminal 22 from the leading wiper to the trailing one. Since one half the current which, in operation, enters at terminal 15 flows in the variable element, and since the two wipers are separated by a resistance 2R, the sudden step in potential due to the operation of switch 17 is exactly compensated by the equal and opposite step due to the operation of switch 18, and a uniform change in potential at the output terminal results. It will be clear that the two wipers must both lie on the variable element at the instant at which the switches operate.

It will be seen that the total resistance of the network between terminals 15 and 16 is 10R and is constant despite stepping of the switches. Between successive switching steps, in a direction say to increase the output voltage, the operative wiper 25 or 26 traverses a part of the variable element of resistance value 2R, and, in doing so, increases the potential of the output terminal 22 smoothly through one tenth of the voltage applied to the network. The erstwhile inoperative wiper is now of a potential less by one tenth of the input voltage, and when the next switching step occurs becomes operative to feed the output terminal 22. But the switching step increases the potential level of the whole element 23 by one tenth of the input voltage so that the potential of the output terminal is unchanged by the switching step. The newly operative wiper then proceeds in its traverse further to raise the output potential through the next tenth of the input voltage.

In the figure, the dotted line indicates that the switches are coupled to the wipers 25, 26 so that the switches are operated whenever a pre-determined phase in the rotation of the wipers is reached; at other times, the switches dwell on their contacts. Many suitable mechanical and electrical couplings will be known to those versed in the art, and for this reason, and for simplicity, the coupling is not illustrated in detail.

The overall accuracy of the device described will be readily be seen to be ten times the accuracy with which the variable element obeys a linear law, since the stepping switch makes ten steps in covering the desired resistance range. Moreover, since the control member of element 23 rotates through one half a revolution between each step, the whole range requires five revolutions of the control member; thus the influence of mechanical inaccuracies in the driving means for the control member is reduced by a factor of five.

Referring now to Fig. 2, a variable resistance of the two-terminal type, in which the invention is embodied, comprises a chain of nine fixed resistors 27—all of substantially the same value R, connected at one end to one terminal 36 of the device; a rotary stepping switch 37 has one fixed contact also connected to this terminal, and the remaining fixed contacts, in succession, are connected to the junctions between the fixed resistors, as shown; the movable contact 38 is connected to one end of a variable element 39 having two wipers 40, 41 arranged as in the embodiment previously described, but spaced by a resistance equal to R; the movable contact 42 of a selector switch 43 is connected to the second terminal 44 of the device, and the two switches are arranged for synchronous, intermittent operation so that the terminal 44 is transferred from one wiper to that following it at each operation of the stepping switch 37.

By suitable choice of former size and wire diameter, the variable element of a device according to this invention may be made to have any desired suitable number of turns, so that the discrimination of the device (in terms of the number of turns per unit change of output voltage or overall resistance) may be made higher than in known devices in which a desired total change is achieved by a variable element which constitutes the whole of the device. Further advantages over such known devices are as follows: the power dissipation, total resistance and operating voltage of the variable element are relatively very small, and thus thicker wire may be used, which is easier to wind and has a longer life; moreover, a former with a low breakdown voltage, such as anodised aluminum strip, may be employed, such a former having excellent stability and resistance to tropical conditions.

I claim:

1. A variable resistance device comprising a resistive element over which a plurality of wipers are adapted to move in continuous succession, the arrangement being such that the part of said element between adjacent wipers in contact with said element has a pre-determined resistance value, a plurality of fixed resistors, and first and second synchronously operable switches, said first switch being arranged to vary connexions between said element and said fixed resistors in steps, and said second switch being arranged to transfer a connexion to a terminal of the device from one wiper to the next succeeding it at each step said resistive element having a resistance of substantially integral value with respect to said fixed resistors and connected in parallel with a group of said resistors the sum of which substantially equals the resistance of said resistive element whereby smooth change over is obtained.

2. A device according to claim 1, in which said first switch serves to connect said element in series with a selected number of said fixed resistors and in parallel with the said group of said resistors, and to vary by a single resistor at each step the total number of series resistors.

3. A device according to claim 2, in which said wipers and said first and second switches are coupled for operation by common driving means.

4. A device according to claim 3, wherein the values of said fixed resistors are so chosen that the device has a desired non-rectilinear law of variation of resistance.

5. A variable resistance device comprising a chain of substantially equal fixed resistors connected in series between two input terminals, a resistive element over which a plurality of wipers are adapted to move in continuous succession arranged so that the part of said element between adjacent wipers in contact with said element has a pre-determined resistance value, a stepping switch adapted to connect said element across a part of said chain, the number of resistors thus paralleled remaining constant as the points of connexion are shifted along the chain by steps of one resistor and having a combined resistance bearing a whole number relation to the resistance of said element, and a selector switch connected to an output terminal and adapted to transfer the output terminal from one wiper to the next succeeding it in synchronism with each shift of said stepping switch, the arrangement being such that when a potential difference is established between said input terminals, the potential difference between successive wipers in contact with said element is substantially equal to that across each of the fixed resistors outside said points of connexion.

6. A device according to claim 5, wherein the resistance of the part of said chain paralleled by said element is the same as the total resistance of the parallel branch including said element, and wherein said pre-determined resistance value is twice the resistance of any of said fixed resistors.

7. A device according to claim 6, wherein said parallel branch includes said element and a padding resistance.

8. A variable resistance device comprising first and second terminals, a plurality of fixed resistors, each of substantially the same pre-determined resistance value, a resistive element over which a plurality of wipers are adapted to move in continuous succession arranged so that the part of said element between adjacent wipers in contact with said element has said pre-determined resistance value, a stepping switch adapted to increase progressively in successive steps the number of said fixed resistors in series between said first terminal and said element and connect said element in parallel with a number of said resistors having substantially the same effective collective impedance, and a selector switch connected to said second terminal and adapted to transfer said second terminal from one wiper to the next succeeding it in synchronism with each step of said stepping switch.

9. A variable resistance comprising a chain of fixed resistors connected in series, a resistive element, a plurality of movable contacts on at least part of said element, a first switch arranged to connect said element in parallel with a plurality of consecutive resistors in said chain, the number of resistors so parallel remaining constant as said first switch shifts the points of connection along said chain by steps of one resistor, a second switch arranged to connect an output terminal to one of said movable contacts and to transfer the connection of said terminal to the other of said movable contacts when said first switch is operated one step.

10. The combination set forth in claim 9, said resistive element having a resistance substantially equivalent to three of said fixed resistors in series, said first switch operating to connect said element in parallel with three of said resistors in series, that portion of said resistive element contained between two movable contacts being equal to the series sum of two resistors whereby a smooth change over is effected as said resistors are cut in and out of the circuit.

11. A high accuracy signal control circuit comprising circuit terminals, a group of substantially equal series connected impedance units connected to one of said circuit terminals, a stepping switch having terminals connected to the ends of said units in vectorially additive sequence and a movable contact arm arranged to contact said switch terminals successively, and open ended impedance control element having selected impedance characteristics from point to point in its structure constituting a parametric embodiment of a chosen function of a given variable, a movable contact means in electrical contact with said impedance control element, cyclic means to move said contact means relative to said impedance control element in accordance with the characteristics thereof to produce a desired impedance resultant from the vectorial addition of certain of said units and said impedance control element, transition switch means arranged to connect said control element and said contact means to another circuit terminal, monitoring means interconnecting and coordinating said transition switch means, said movable contact means and said contact arm at selected point in the cycle of said cyclic means whereby the resultant impedance between said circuit terminals varies with respect to time in a predetermined manner with a high degree of accuracy.

12. The combination set forth in claim 11, said monitoring means causing said stepping switch to contact a next adjacent terminal and said transition switch to eliminate said impedance control element form the circuit at that instant in the cycle of said cyclic means at which the impedance value of said impedance control element included in the circuit between said circuit terminals equals the impedance of one of said units whereby a smooth resultant impedance curve is obtained free of discontinuity.

13. The combination set forth in claim 11, said monitoring means causing said stepping switch to contact a next adjacent terminal and said transition switch to eliminate said impedance control element from the circuit during that portion of the cycle of said cyclic means at which the impedance value of said impedance control element included in the circuit between said circuit terminals differs from the impedance of one of said units by a selected amount whereby a desired resultant impedance curve is obtained having pulses of select amplitude and frequency and selected connecting values.

14. The combination set forth in claim 9, said resistive element being open ended.

E. FRANKLIN.

REFERENCES CITED

The following references are of record in the file of this patent:

UNITED STATES PATENTS

| Number | Name | Date |
|---|---|---|
| 1,121,750 | Miller | Dec. 22, 1914 |
| 1,758,966 | Tanner | July 1, 1930 |